United States Patent
Lemoff et al.

(10) Patent No.: US 10,613,334 B2
(45) Date of Patent: Apr. 7, 2020

(54) ADVANCED FEMTOPROJECTOR OPTICAL SYSTEMS

(71) Applicant: Spy Eye, LLC, Los Gatos, CA (US)

(72) Inventors: Brian Elliot Lemoff, Morgan Hill, CA (US); George Michael Mihalakis, San Jose, CA (US)

(73) Assignee: Tectus Corporation, Saratoga, CA (US)

( * ) Notice: Subject to any disclaimer, the term of this patent is extended or adjusted under 35 U.S.C. 154(b) by 102 days.

(21) Appl. No.: 15/985,511

(22) Filed: May 21, 2018

(65) Prior Publication Data

US 2019/0353903 A1 Nov. 21, 2019

(51) Int. Cl.

| | | |
|---|---|---|
| *G02B 27/01* | (2006.01) | |
| *G02C 7/04* | (2006.01) | |
| *G02B 27/20* | (2006.01) | |
| *G02B 27/00* | (2006.01) | |
| *G02C 11/00* | (2006.01) | |
| *G03B 21/20* | (2006.01) | |

(52) U.S. Cl.
CPC ..... *G02B 27/0172* (2013.01); *G02B 27/0093* (2013.01); *G02B 27/0179* (2013.01); *G02B 27/20* (2013.01); *G02C 7/049* (2013.01); *G02C 11/10* (2013.01); *G03B 21/2033* (2013.01); *G02B 2027/013* (2013.01); *G02B 2027/0138* (2013.01); *G02B 2027/0147* (2013.01); *G02B 2027/0187* (2013.01); *G02B 2027/0196* (2013.01)

(58) Field of Classification Search
CPC .............. G02B 27/0172; G02B 27/20; G02B 27/0093; G02B 27/0179; G02B 2027/0147; G02B 2027/013; G02B 2027/0196; G02B 2027/0187; G02B 2027/0138; G02C 11/10; G02C 7/049; G02C 7/04; G02C 7/086; G03B 21/2033
See application file for complete search history.

(56) References Cited

U.S. PATENT DOCUMENTS

| | | |
|---|---|---|
| 4,711,512 A | 12/1987 | Upatnieks |
| 5,638,218 A | 6/1997 | Oomura |
| 5,638,219 A | 6/1997 | Medina Puerta et al. |
| 6,560,039 B1 | 5/2003 | Webb et al. |
| 8,134,778 B2 | 3/2012 | Guyer |
| 8,571,789 B2 | 10/2013 | Monde et al. |

(Continued)

FOREIGN PATENT DOCUMENTS

GB     1216075 A     12/1970

OTHER PUBLICATIONS

Avago Technologies, "ADNE-2620 Optical Mouse Sensor Data Sheet," Mar. 27, 2008, 27 pages.

(Continued)

*Primary Examiner* — Abhishek Sarma
(74) *Attorney, Agent, or Firm* — Fenwick & West LLP

(57) ABSTRACT

A variety of femtoprojector optical systems are described. Each of them can be made small enough to fit in a contact lens using plastic injection molding, diamond turning, photolithography and etching, or other techniques. Most of the systems include a solid transparent substrate with a curved primary mirror formed on one face, a secondary mirror formed on the opposite face, and an annular exit aperture located axially between the two mirrors The designs use light blocking, light-redirecting, absorbing coatings or other types of baffle structures to reduce stray light.

32 Claims, 14 Drawing Sheets

(56) References Cited

U.S. PATENT DOCUMENTS

| | | |
|---|---|---|
| 8,786,675 B2 | 7/2014 | Deering |
| 8,956,281 B2 | 2/2015 | Wilson |
| 9,063,352 B2 | 6/2015 | Ford et al. |
| 9,111,473 B1 | 8/2015 | Ho et al. |
| 9,134,534 B2 | 9/2015 | Border et al. |
| 9,251,745 B2 | 2/2016 | Sprague |
| 2002/0140906 A1 | 10/2002 | Gibbon et al. |
| 2005/0180687 A1 | 8/2005 | Amitai |
| 2009/0185135 A1 | 7/2009 | Volk |
| 2009/0189830 A1 | 7/2009 | Deering et al. |
| 2010/0033561 A1 | 2/2010 | Hersee |
| 2011/0176205 A1 | 7/2011 | Shaw et al. |
| 2011/0221658 A1 | 9/2011 | Haddick |
| 2011/0221659 A1 | 9/2011 | King, III et al. |
| 2013/0278631 A1 | 10/2013 | Border |
| 2014/0098226 A1 | 4/2014 | Pletcher et al. |
| 2014/0118829 A1 | 5/2014 | Ma |
| 2014/0204003 A1 | 7/2014 | Deering |
| 2015/0301338 A1 | 10/2015 | Van Heugten |
| 2015/0312560 A1 | 10/2015 | Deering et al. |
| 2016/0026253 A1 | 1/2016 | Bradski |
| 2016/0097940 A1 | 4/2016 | Sako et al. |
| 2016/0150951 A1 | 6/2016 | Du |

OTHER PUBLICATIONS

"8.2 All-Reflecting Two-Mirror Telescopes," Datasheet telescope-optics, telescope-optics.net, Aug. 3, 2016, 4 pages, [Online] [Retrieved on Dec. 14, 2017] Retrieved from the Internet<URL:https://web.archive.org/web/20160803183105/http://www.telescope-optics.net/two-mirror.htm>.

PCT International Search Report and Written Opinion, PCT Application No. PCT/US17/57240, dated Jan. 12, 2018, 23 pages.

Peifu, G., "Design and Preparation of Quarter-Wave Plate Coatings," National Air Intelligence Center, May 12, 1995, 16 pages.

Tremblay, E.J. et al., "Ultrathin Cameras Using Annular Folded Optics," Applied Optics, pp. 463-471, vol. 46, No. 4.

All-Reflecting Two-Mirror Telescopes, (Aug. 3, 2016), URL: https://web.archive.org/web/20160803183105/http://www.telescope-optics.net/two-mirror.htm, (Dec. 14, 2017) (5 pages).

Song et al "Baffles design for the axial two-mirror telescope", Optical Engineering, 2002, vol. 41, No. 9, pp. 2353-2357.

International Search Report and Written Opinion for Application No. PCT/US19/39013, dated Aug. 29, 2019, 15 pages.

0.00-0.01   0.01-0.02   0.02-0.03   0.03-0.04   0.04-0.05

ADVANCED FEMTOPROJECTOR OPTICAL SYSTEMS

BACKGROUND

1. Technical Field

This disclosure relates generally to projectors for eye-mounted displays.

2. Description of Related Art

An eye-mounted display has been proposed by Deering. See, e.g. U.S. Pat. No. 8,786,675, "Systems using eye mounted displays." One type of eye-mounted display is based on a tiny projector mounted inside a contact lens. The projector projects images onto the retina of a person wearing the contact lens. The projector must be very small to fit in the contact lens, so small that, for convenience, Deering called it a "femtoprojector". A typical femtoprojector preferably is no larger than about one or two millimeters in any dimension.

Eye-mounted displays can be used for virtual reality applications and also for augmented reality applications. In virtual reality applications, the images projected by the eye-mounted display replace what the user would normally see as his external environment. In augmented reality applications, the images projected by the eye-mounted display augment what the user would normally see as his external environment, for example they may appear as additions to the external environment.

The femtoprojectors in an eye-mounted display include an image source and an optical system. A femtoprojector's optical system is designed to project images from the image source onto the retina so that the images appear in a person's field of vision. The femtoprojector optical systems are constrained to fit inside a contact lens while also providing appropriate magnification and sufficient image quality.

BRIEF DESCRIPTION OF THE DRAWINGS

Embodiments of the disclosure have other advantages and features which will be more readily apparent from the following detailed description and the appended claims, when taken in conjunction with the accompanying drawings, in which:

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Femtoprojector optical systems are designed to project images from an image source that is inside a contact lens onto a user's retina. Femtoprojector optical systems described below are small enough to fit inside contact lenses, can be made with realistic manufacturing processes, and are designed to provide good image quality on a person's retina. In one class of designs, the optical systems include a solid transparent substrate with a curved primary mirror formed on one face of the substrate and a secondary mirror formed on an opposing face of the substate. An annular exit aperture is axially positioned between the two mirrors. Light blocking, light-redirecting, absorbing coatings and other types of baffle structures are used to reduce or eliminate stray light.

Figure 1A:
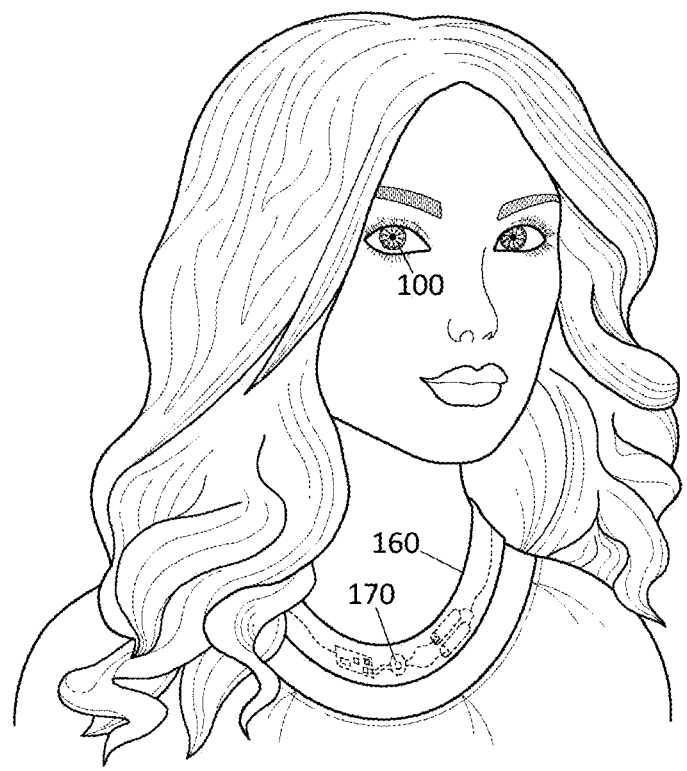
FIG. 1A shows a user wearing an eye-mounted display in communication with an auxiliary necklace.
Figure 1B:
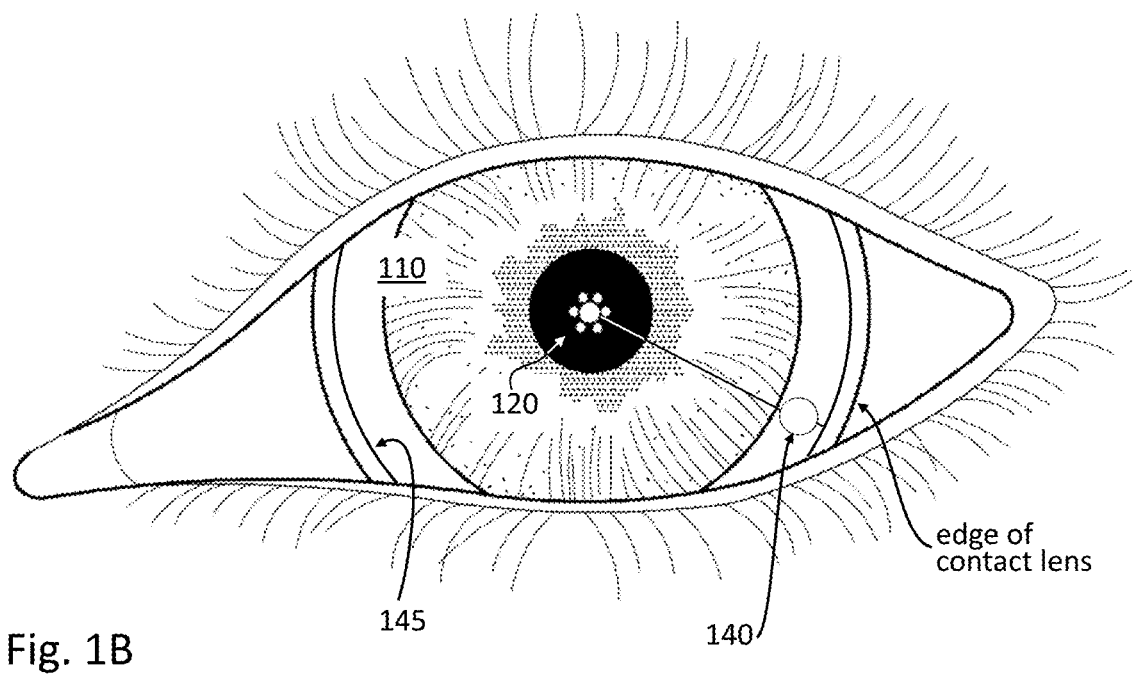
FIG. 1B shows a magnified view of the eye-mounted display mounted on the user's eye.

FIG. 1A shows a user wearing an eye-mounted display 100 in communication with a necklace 160. FIG. 1B shows a magnified view of the user's eye and eye-mounted display 100. The eye-mounted display 100 includes a contact lens 110 that is worn on the surface of the eye. The following examples use a scleral contact lens but the contact lens does not have to be scleral. The contact lens 110 contains one or more femtoprojectors 120. The femtoprojectors 120 project images onto the user's retina.

The contact lens 110 moves with the user's eye 100 as the user's eye rotates in its socket. Because the femtoprojectors 120 are mounted in the contact lens 110, they also move with the user's eye and may always project to the same region of the retina. Some femtoprojectors may always project images to the fovea, and other femtoprojectors may always project images to more peripheral regions which have lower resolutions.

In this example, the contact lens 110 also contains electronics 140 and a coil 145. In some embodiments, the coil 145 is a power coil that receives power wirelessly, for example via magnetic induction. In other embodiments, the contact lens 110 includes a battery that supplies power to the femtoprojectors 120. The electronics 140 may be used to control the femtoprojectors, receive or process images from the femtoprojectors, provide power to the femtoprojectors, and/or transmit data to/from the femtoprojectors. The contact lens 110 may also include other components.

FIG. 1A shows an implementation where, in addition to the eye-mounted display 100, the user is also wearing a necklace 160 that contains components of the eye-mounted display system. In this example, the necklace 160 includes a wireless transmitter 170 that transmits image data and/or power to the eye-mounted display 100. Image transmission to an eye-mounted display is subject to data rate constraints due to size and power consumption limitations of electronics in a contact lens.

Figure 2A:
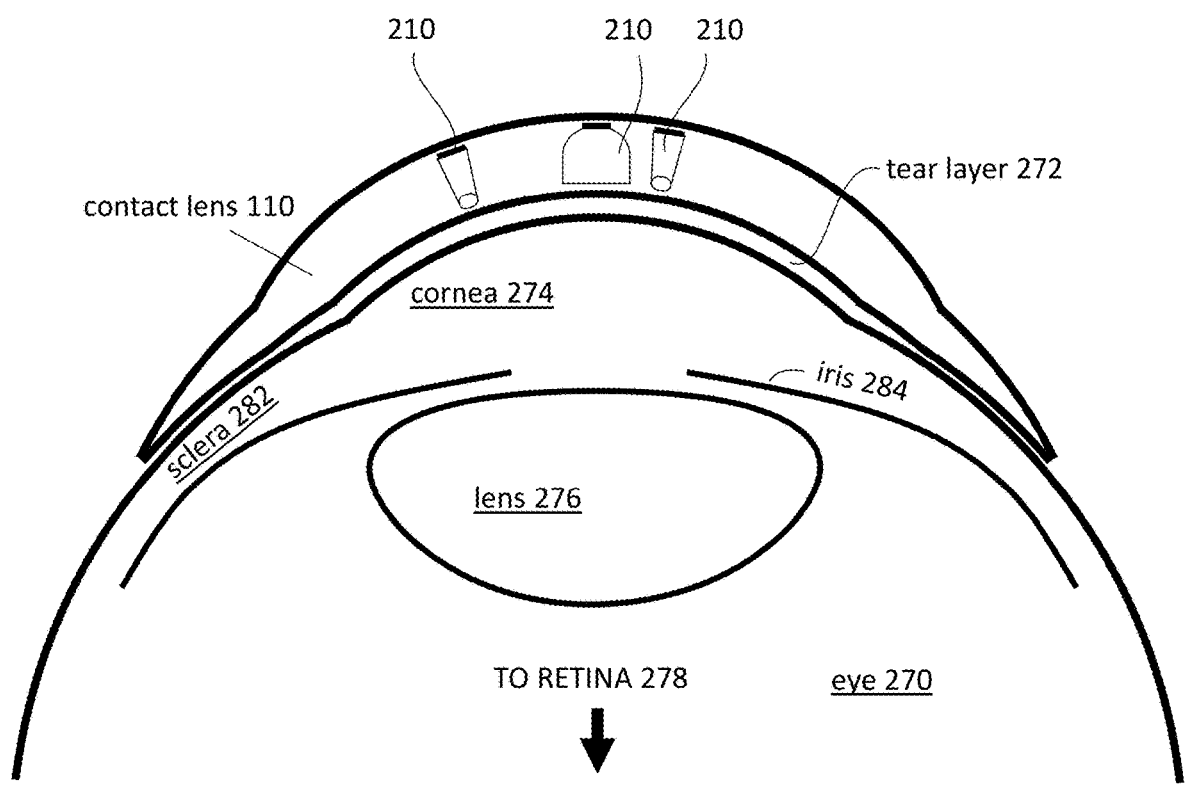
FIG. 2A shows a cross sectional view of an eye-mounted display with femtoprojectors in a contact lens.

FIG. 2A shows a cross sectional view of an eye-mounted display containing a set of femtoprojectors 210 in a scleral contact lens 110. In this example, there are different types of femtoprojectors 210. The contact lens 110 is separated from the cornea 274 of the user's eye 270 by a tear layer 272. Over the cornea 274, the tear layer 272 may be as thick as a hundred microns or more while it may be only a few microns thick over the sclera 282. The aqueous of the eyeball is located between the cornea and the crystalline lens 276 of the eye. The vitreous fills most of the eyeball including the volume between the crystalline lens 276 and the retina 278. The iris 284 limits the aperture of the eye.

The contact lens 110 preferably has a thickness that is less than two mm, and the femtoprojectors 210 preferably fit in a 2 mm by 2 mm by 2 mm or smaller volume. The contact lens 110 should be comfortable to wear and maintains eye health by permitting oxygen to reach the cornea 274.

Figure 2B:
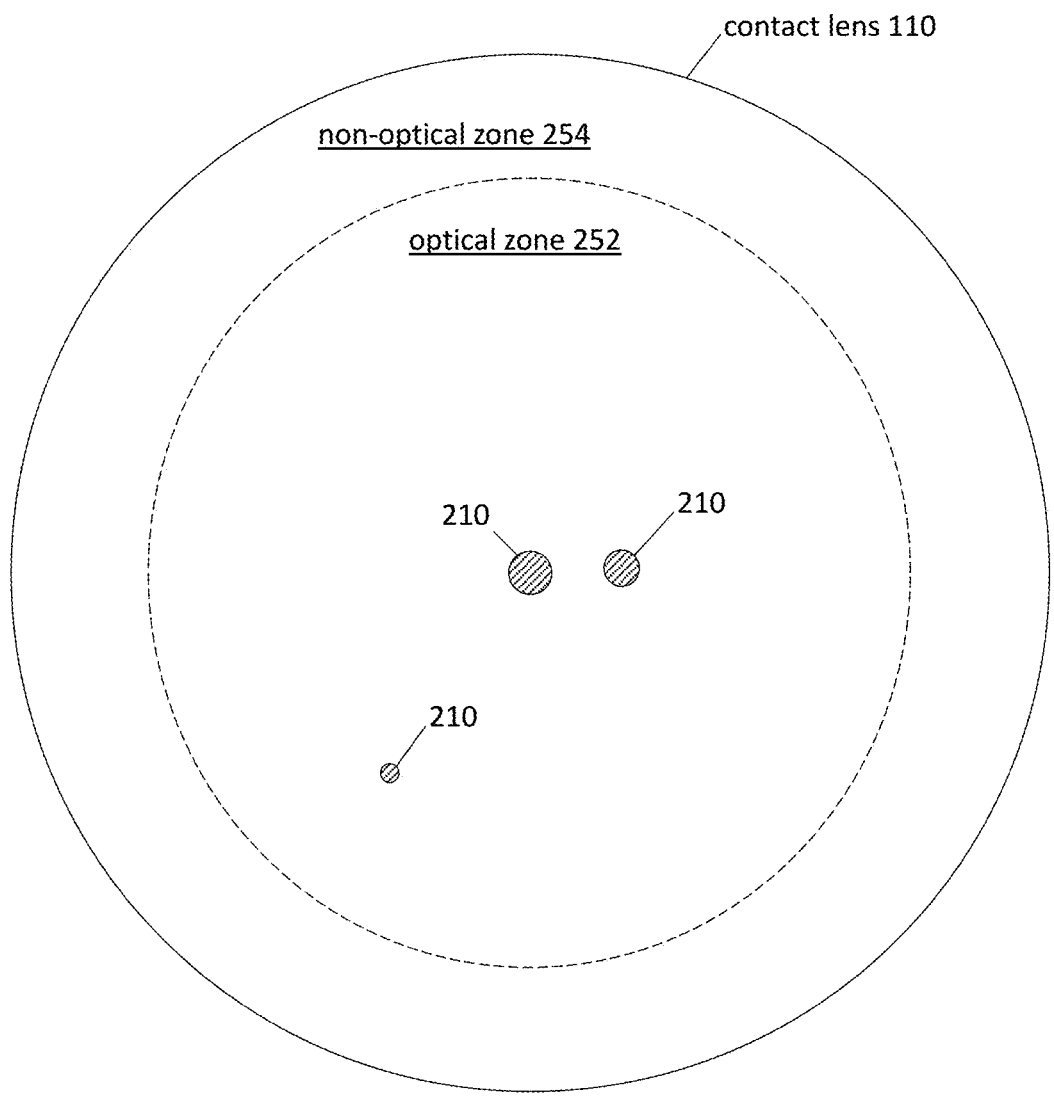
FIG. 2B shows a top view of an eye-mounted display containing femtoprojectors in a contact lens.

FIG. 2B shows a top view of an eye-mounted display with multiple femtoprojectors 210 in a contact lens 110. The ratio of the contact lens diameter to femtoprojector lateral size is roughly 25:1 for the largest femtoprojector. This ratio is normally between about 15:1 and 30:1, but may be as small as 5:1 or smaller or as large as 50:1 or larger. FIG. 2B shows three femtoprojectors 210 in the contact lens, but many femtoprojectors, or only one, may be mounted in such a contact lens. Eye-mounted displays with as many as 49 femtoprojectors in a contact lens have been proposed. If there is only one femtoprojector in a lens, it need not be in the center of the lens.

The femtoprojectors 210 in FIG. 2B are also shown as having different sizes. The retinal receptive fields are more densely packed towards the fovea and become progressively less densely packed away from the fovea. Accordingly, in one implementation, femtoprojectors that project to the fovea generate higher resolution images on the retina, and those that project to the periphery of the retina generate correspondingly lower resolution images. The entire display, made up of all the femtoprojectors, may be a variable resolution display that generates only the resolution that each region of the eye can actually see, vastly reducing the total number of individual display pixels required compared to displays of equal resolution and field of view that are not eye-mounted. Pixels in an eye-mounted display that are viewed by lower resolution off-foveal regions of the retina may project with lower resolution onto the retina while still matching the eye's resolution.

In FIG. 2B, the contact lens 110 is roughly divided by the dashed circle into an optical zone 252 and a non-optical zone 254. Components in the optical zone 252 may be in the optical path of the eye, depending on how far open the pupil is. Components in the non-optical zone 254 fall outside the aperture of the eye. In addition to the femtoprojectors 210, the contact lens may also contain other components for data transmission, power and/or positioning. Data transmission components may include antennae or optical/infrared photodetectors, data storage and buffering, controls, and possibly also on-lens processing. Power components may include coils for power transmission and batteries for power storage. Positioning components may include accelerometers and fiducial or other structures used for eye tracking and head tracking.

In addition to the eye-mounted display, the overall system may also include a head tracker, eye tracker and scaler. The system receives input images (including possibly video), which are to be displayed to the human user via the eye-mounted display. The femtoprojectors project the images on the user's retina, thus creating an image of virtual objects in the user's field of view. The scaler receives the input images and produces the appropriate data and commands to drive the femtoprojectors. The head tracker and eye tracker provide information about head movement/position and eye movement/position, so that the information provided to the femtoprojectors can be compensated for these factors.

There are many ways in which this functionality can be configured with an eye-mounted display(s) to create embodiments of eye-mounted display systems. Portions of these subsystems may be external to the user, while other portions may be worn by the user in the form of a headpiece or glasses. Components may also be worn on a belt, armband, wrist piece, necklace or other types of packs.

Figure 3A:
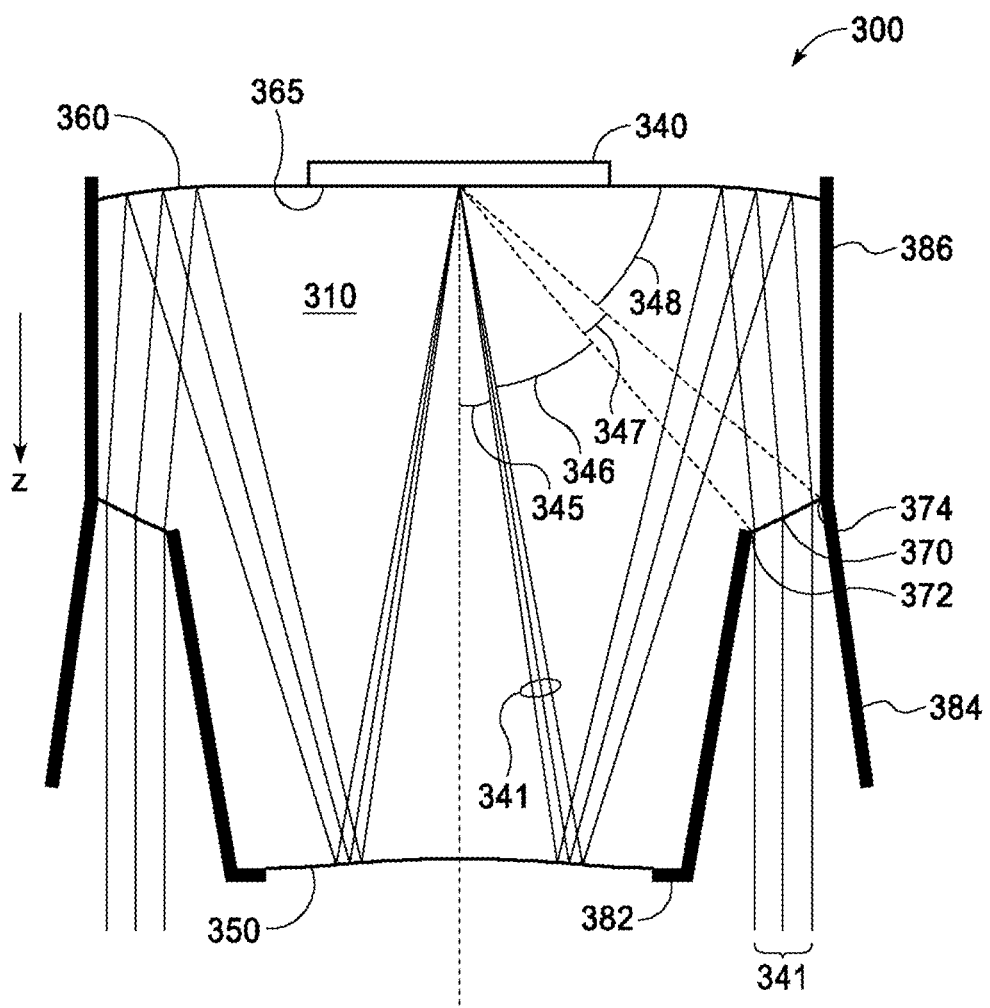
FIGS. 3A-3C show cross sectional views of a femtoprojector optical system, with rays from a center, left edge and right edge of the image source, respectively.
Figure 3B:
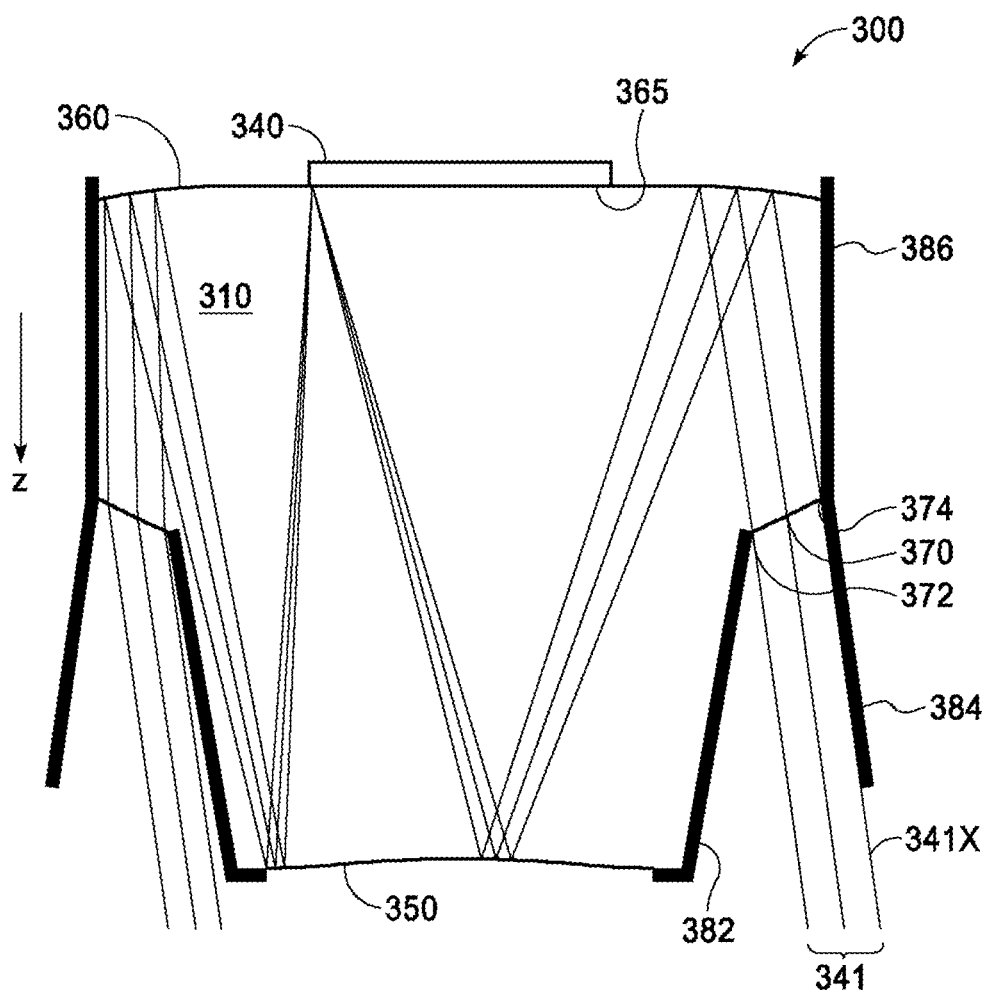
Figure 3C:
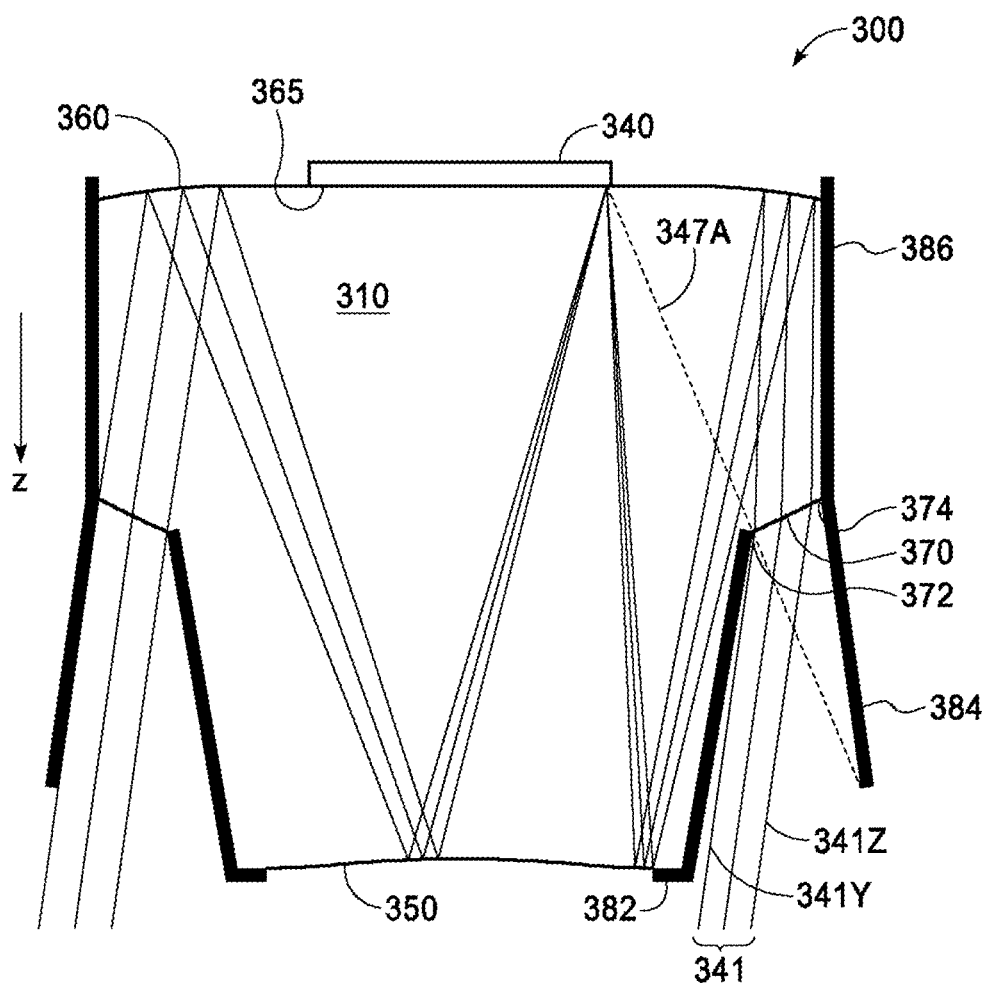
Figure 4A:
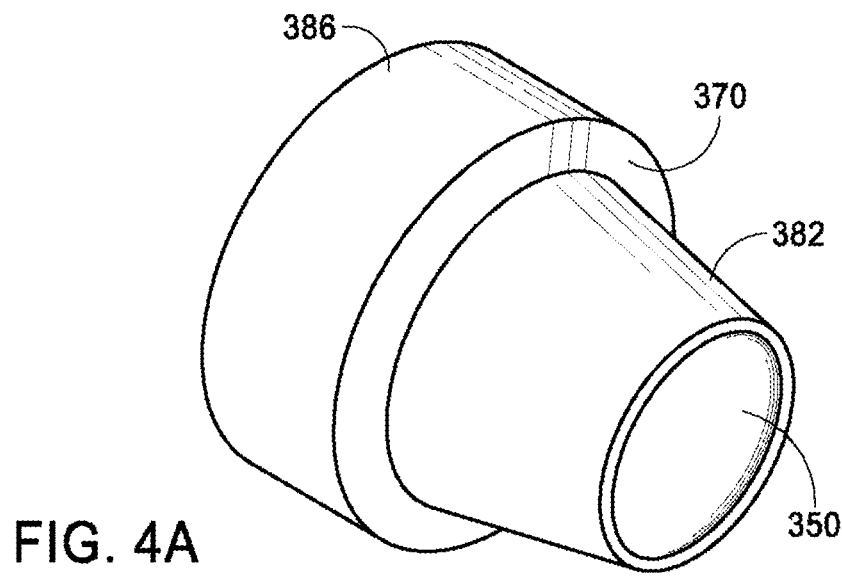
FIGS. 4A and 4B show perspective views of a femtoprojector optical system.
Figure 4B:
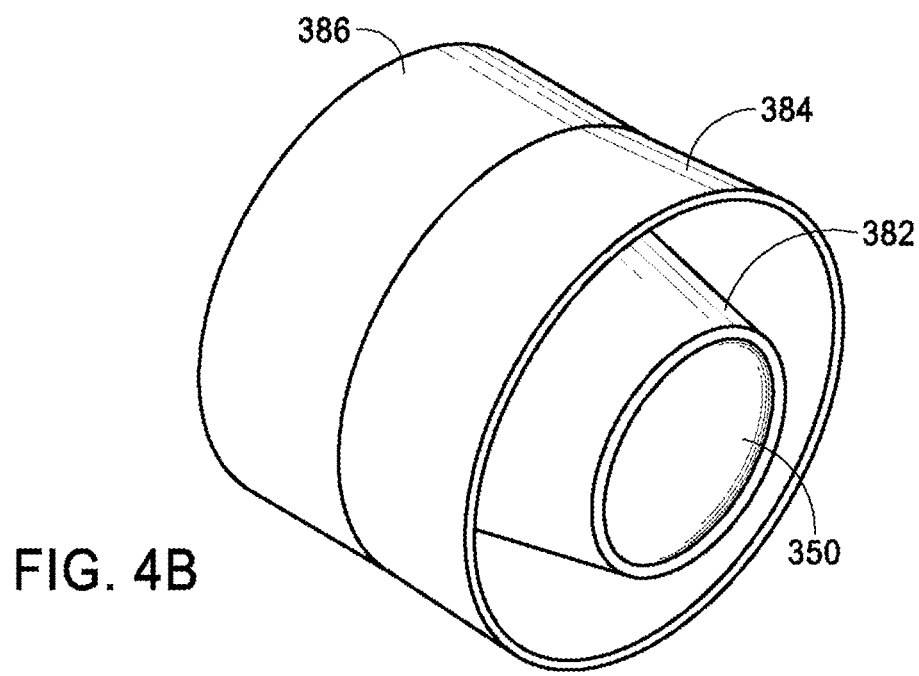

FIGS. 3A-3C show cross sectional views of a femtoprojector optical system 300, and FIGS. 4A-4B show perspective views of a femtoprojector optical system. The system of FIG. 3 includes a solid, transparent substrate 310 having index of refraction $n_1$. Contact lens material, in which a femtoprojector optical system may be embedded, has an index of refraction $n_2$. The solid transparent substrate 310 may be made from plastic, glass or other transparent materials.

The system of FIG. 3 includes a concave primary mirror 360 and a convex secondary mirror 350. Either or both of these may be aspheric. The concave primary mirror 360 may be formed by coating a face of the substrate 310 with a reflective material such as a metal (e.g. aluminum or silver) or an engineered stack of dielectric layers. The shape of the primary mirror 360 may be made by any of several different techniques. For example, if the substrate is injection-molded plastic, then the shape of the primary mirror 360 follows the shape of the mold used. Alternatively, the shape of the primary mirror 360 may be made by diamond turning the substrate on a lathe. Or, the shape of the primary mirror 360 may be made by photolithography and etching steps. Gray scale photolithography may be used to etch a mirror surface profile, for example. Wafer scale optics techniques including embossing, compression molding and/or UV curing photosensitive polymers may also be used to form mirror profiles. Additive manufacturing or three-dimensional printing (e.g. via two-photon polymerization) techniques may also be employed.

The primary mirror 360 includes a clear, non-reflective mounting area 365. An image source 340, such as an LED (light emitting diode) display chip with an array of individually addressable emitters, is mounted at this location. Alternate image sources include illuminated photomasks or single light emitting diodes, as examples. Of course, video is more exciting than a static pattern or one with only very few pixels. However, these more limited image sources are useful for some applications.

The secondary mirror 350 faces the image source 340, and the primary mirror 360 faces the secondary mirror 350. The secondary mirror 350 may be formed using similar techniques as the primary mirror 360, for example by coating the substrate 310 with a reflective material. Light rays from the image source 340 are first incident on and reflected by the secondary mirror 350, which is convex in this example. The reflected rays are then incident on and further reflected by the primary mirror 360 before exiting the optical system through the annular exit aperture 370. The primary mirror 360 is bigger than the secondary mirror 350. When the optical system is used in a femtoprojector, light from the image source 340 strikes the secondary mirror 350 and then the primary mirror 360. The secondary mirror 350 may be larger or smaller than the opening 365 in the primary mirror.

The secondary mirror 350 and primary mirror 360 cooperate to project the image from the image source 340 out the exit aperture 370 and onto the user's retina. However, not all light rays from the image source 340 are included in image formation. Those light rays that are projected to form an image are referred to as image-forming rays. The remaining light rays from the image source 340 are referred to as stray rays. In FIG. 3, the exit aperture 370 is annular in shape (but not required to be planar). It is defined by an inner edge 372 and outer edge 374. The exit aperture 370 limits which rays propagate to the eye to form the image. The exit aperture 370 is not axially aligned with either of the mirrors 350, 360. That is, the z-coordinate of the exit aperture 370 is between that of the primary mirror 360 and the secondary mirror 350. In FIG. 3, the exit aperture 370 is located approximately midway between the two mirrors 350, 360.

The system also includes a light baffle system to block or at least reduce stray rays from reaching the eye. In FIG. 3, the baffle system includes an inner baffle 382 which serves as a three-dimensional obscuration, and a side baffle with an external portion 384 and an internal portion 386. The baffles may be either an integral part of the femtoprojector optical system or a surrounding structure in which the optical system is mounted. Absorbing or black baffles may also make the femtoprojector less visible to others. In one implementation, the obscuration 382 and internal side baffle 386 are made by depositing an absorbing material such as carbon, roughened or etched nickel ("nickel black"), black chrome, or Vantablack (Surrey NanoSystems, Newhaven, UK) on the transparent substrate 310, which serves as the core of the optical system. Black indium-tin oxide may also be used. The external side baffle 384 may be separate from the substrate 310, for example, it may be an absorbing material deposited on the sides of a hole into which the core is inserted during assembly.

In FIG. 3, the baffle system is designed to block all of the stray rays that would have a direct path from the image source 340 through the exit aperture 370, so that no stray rays have a direct path from the image source 340 to the pupil of the user's eye. Accordingly, the obscuration 382 extends an entire length between the secondary mirror 350 and the inner edge 372 of the exit aperture. The external side baffle 384 extends from the outer edge 374 of the exit aperture away from the primary mirror 360 and is sufficiently long to block all stray rays that propagate directly from the image source 340 through the exit aperture 370. Although not required in FIG. 3, it may be extended to an edge that is axially aligned with the secondary mirror 350 without adding length to the overall system. The internal side baffle 386 extends an entire length from the outer edge 374 of the exit aperture to the primary mirror 360. In other embodiments, the baffle system may block less than all of the stray rays, so the baffles may be shorter.

FIG. 3A shows a fan of rays produced by the center point of the image source 340. This fan can have a fairly wide divergence if the source is an LED or other source that is not well collimated. In many cases, the image source 340 produces light with a Lambertian distribution. In FIG. 3A, rays from the center of the image source 340 can be classified as follows. The bundle of rays 341 (where the edges of the bundle are defined by the two solid rays) are reflected by the secondary mirror 350 and the primary mirror 360 and are projected to form the image on the user's retina. These are the image-forming rays 341. In FIG. 3A, the image-forming ray bundle 341 is labelled both as it is emitted from the image source 340 and also as it exits through the exit aperture 370.

The remaining rays are stray rays, which are managed as follows. Stray rays in bundle 345 are reflected by the secondary mirror 350 and are eventually absorbed by either the image source 340 or the obscuration 382. Stray rays in bundle 346 (between the solid ray and the dashed ray) are blocked by the obscuration 382. Stray rays in bundle 347 (between two dashed rays) propagate through the exit aperture 370 and are blocked by the external side baffle 384. The remaining stray rays 348, which propagate from the image source at oblique angles, are blocked by the internal side baffle 386. For clarity, only the righthand rays are marked in FIG. 3A, but a similar situation exists for the lefthand rays.

FIGS. 3B and 3C show fans of the image-forming rays produced by the two edge points of the image source 340. The stray rays are managed in a similar fashion as described in FIG. 3A. The edge points of FIGS. 3B and 3C also lead to the following considerations. Again, consider only the righthand rays. In FIG. 3B, the external side baffle 384 is tapered outwards (or otherwise shaped) from the outer edge 374 of the exit aperture so that it does not block the outermost image-forming ray 341X. Ray 341X is emitted from the farthest point of the image source and passes through the outer edge 374 of the exit aperture. As a result, it is propagating at the outermost angle of all image-forming rays. If external side baffle 384 does not block ray 341X, it also will not block any of the other image-forming rays. In addition, as shown in FIG. 3C, the external side baffle 384 is long enough to block stray ray 347A. Because ray 347A originates from the outermost edge of the image source 340 and passes through the inner edge 372 of the exit aperture, it will intersect the side baffle 384 at the farthest possible axial distance from the image source 340.

Also in FIG. 3C, the obstruction 382 and internal side baffle 386 are shaped so that they do not block either image-forming ray 341Y or 341Z. Ray 341Y originates from the nearest point on the image source and passes through the inner edge 372 of the exit aperture. As a result, it is propagating at the innermost angle of all image-forming rays. If obstruction 382 does not block ray 341Y, it also will not block any of the other image-forming rays. In FIG. 3, the three-dimensional obstruction 382 is the combination of an annulus next to the secondary mirror 350 plus a conical frustum that extends the entire length between the annulus and the inner edge 372 of the exit aperture.

FIGS. 4A-4B show perspective views of the femtoprojector optical system from FIG. 3. FIG. 4A shows just the coated substrate 310. The internal side baffle 386 is cylindrical in shape (i.e., the sides are parallel to the optical axis of the system). The obstruction 382 is a frustum plus a narrow annulus, which is adjacent to the secondary mirror 350. The exit aperture 370 is the transparent annulus between the internal side baffle 386 and obstruction 382. In some designs, the exit aperture 370 has an axial location that is closer to midway between the primary and secondary mirrors, than to either the primary mirror 360 or the secondary mirror 350. For example, if z is the axial dimension and the two mirrors are located at z=0 mm and z=1 mm, then the exit aperture is located in the range 0.25 mm<z<0.75 mm. The primary mirror and the mounting area for the image source are on the back face of the substrate, which is not visible in FIG. 4A. FIG. 4B also shows the external side baffle 384.

As noted above, the design in FIGS. 3-4 blocks all stray rays from entering the pupil of the user's eye. However, this is not strictly required. The different baffles 382, 384, 386 do not have to extend the entire lengths shown. They may be shorter in some designs. For example, the obstruction 382 may occupy some of the space between the secondary mirror 350 and the inner edge 372 of the exit aperture, but without extending that entire length. It may extend from the secondary mirror 350 towards the primary mirror 360 but without reaching the inner edge 372 of the exit aperture. Similarly, the external side baffle 384 may extend from the outer edge 374 of the exit aperture, but may not be long enough to block all stray rays that propagate from the image source 340 through the exit aperture 370. The same is true for the internal side baffle 386. In some cases, there may not be an internal side baffle 386 if the oblique stray rays are weak or managed by another mechanism. For example, the oblique rays may reflect around inside the substrate 310 without any viable path to reach the exit aperture 370 propagating in a direction that would reach the user's pupil. The obliquely propagating rays that do reach the exit aperture 370 may be incident on and blocked by either the external side baffle 384 or the back side of the obstruction 382.

The baffles 382, 384, 386 also do not have to have the shapes shown. For example, any absorbing structure that extends from the edge of the secondary mirror 350 to the inner edge 372 of the exit aperture without blocking the image-forming rays 341 shown in FIG. 3C will serve the same purpose as the obstruction 382 with the shape shown in FIG. 3. Different shapes may have advantages in manufacturing or assembly.

As a final set of variations, FIGS. 3B-3C show some situations where certain image-forming rays 341 should not be blocked by the baffles. However, this is not strictly required. Blocking some of the image-forming rays 341 may be acceptable in some designs.

Design of femtoprojector optical systems described herein is complicated by constraints such as the very small volume in which the system must fit for certain applications, refractive indices of the substrate and the surrounding contact lens material, required optical magnification specifications, luminous flux required at the retina given a low-power image source, and image sharpness and contrast. The size and curvature of the primary and secondary mirrors; the size, curvature and placement of the exit aperture; the size, shape and placement of the baffles; the size of the clear area in the primary mirror; and the indices of refraction are all examples of parameters that may be adjusted by an optical designer to optimize different design priorities such as optical throughput, depth of focus, pixel size at the retina, and diffraction effects, while still minimizing stray light.

In some designs, the image source 340 is not more than 500 microns in size. For example, the image source 340 may be a 500×500 array of individually addressable emitters (LEDs), with an emitter-to-emitter pitch of not more than 12 microns and preferably not more than 1 micron. A 500×500 array with 1 micron pitch is approximately 500 microns on a side. An array with 500×500 color pixels, each of which has three different color LEDs, is less than 1 mm on a side using 1 micron pitch. The femtoprojector optical system may provide a magnification of approximately 3-10× or up to 30× or more from the image source 340 to the user's retina. The resulting image projected on the user's retina may appear to span approximately 5 degrees to approximately 20 degrees of the user's field of view, as measured in air in object space using a standard eye model. This may be referred to as the span of eccentricity for the femtoprojector.

Figure 5A:
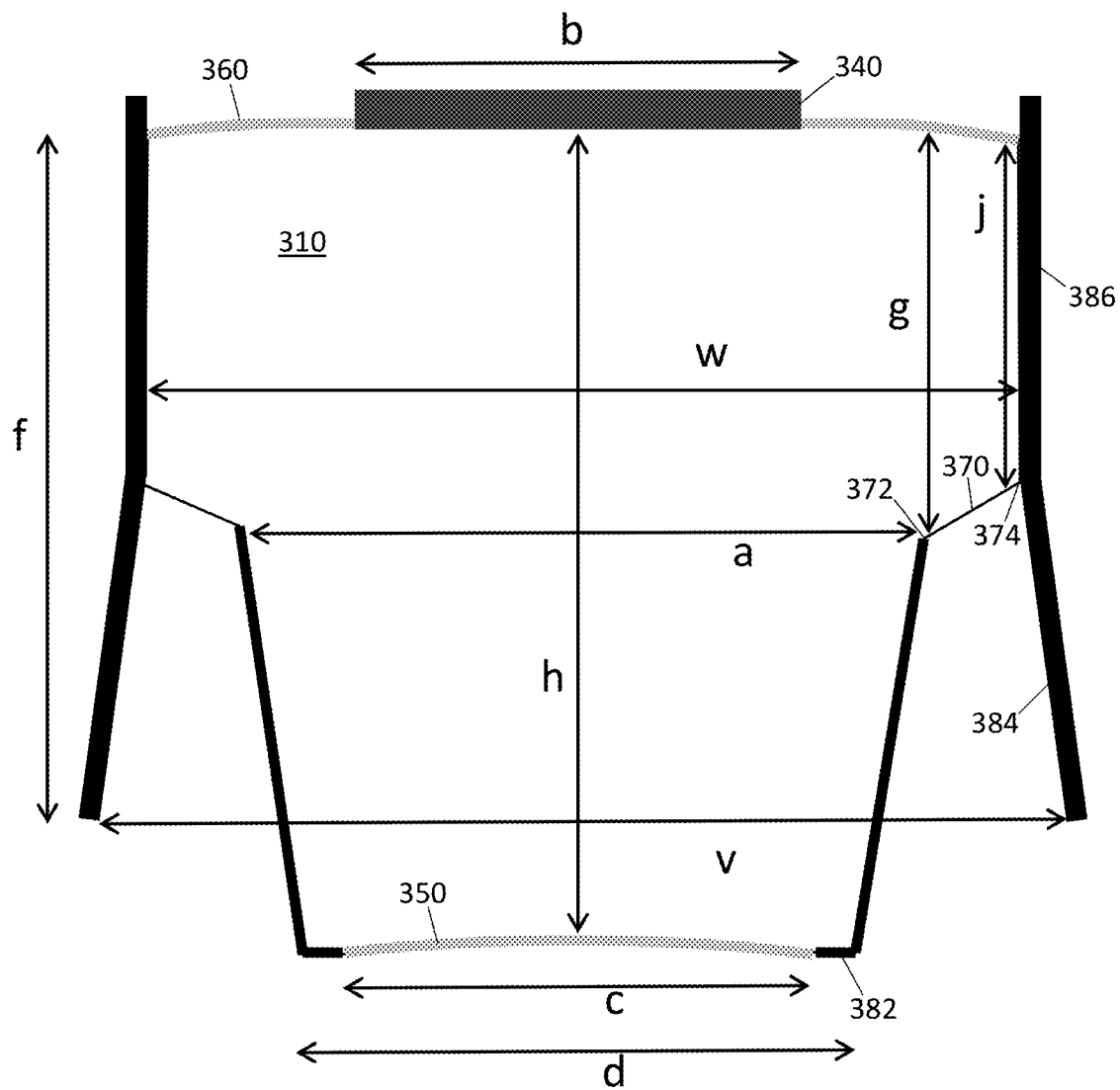
FIGS. 5A and 5B show cross sectional views of a femtoprojector optical system and an eye with a femtoprojector, illustrating design tradeoffs.
Figure 5B:
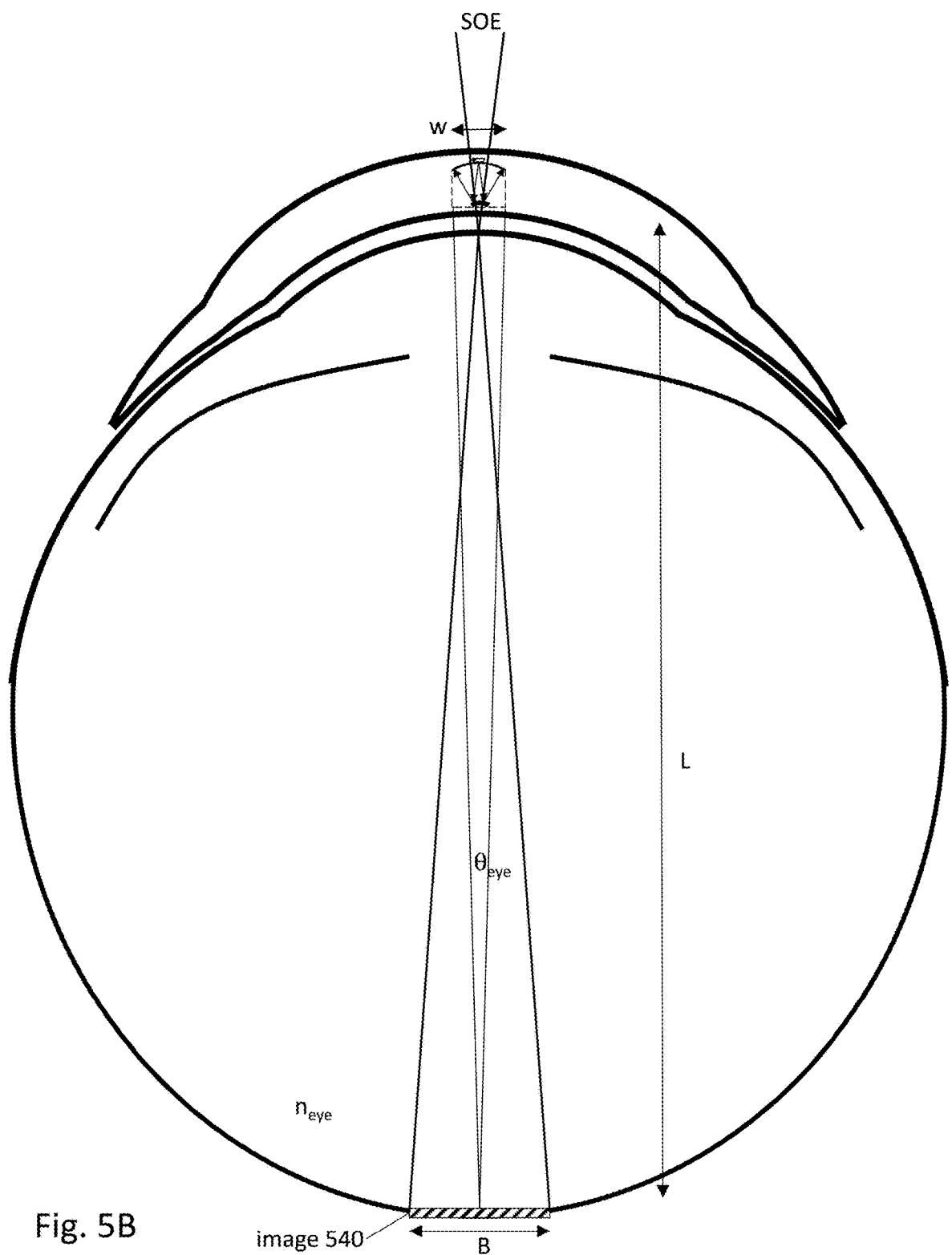

FIGS. 5A-5B illustrate some design tradeoffs for the femtoprojector optical system. The following examples are simplified in order to illustrate the tradeoffs. For example, the small angle approximation will be used liberally, so that $\alpha = \sin\alpha = \tan\alpha$, even though the angles considered may not be small in actual designs. More accurate calculations may be used when designing actual systems. FIG. 5A shows a cross-section of the femtoprojector optical system using the following nomenclature. "b" is the diameter of the image source 340 which is assumed to be round. "c" is the diameter of the secondary mirror 350. "a" is the outer diameter of the obscuration 382, which in this case is also the diameter of inner edge 372 of the exit aperture. "g" is the distance between the primary mirror 360 to the inner edge 372 of the exit aperture. (a,g) together define the location of the inner edge 372 of the exit aperture. "w" is the diameter of the primary mirror 360, which in this case is also the diameter of the internal side baffle 386. "j" is the distance between the primary mirror 360 to the outer edge 374 of the exit aperture. (w,j) together define the location of the outer edge 374 of the exit aperture. "h" is the height/length of the optical system (i.e., distance from image source 340 to secondary mirror 350). "f" is the length of the entire side baffle including both the internal and external parts 386, 384. "d" is the diameter of the base of the obstruction 382. "v" is the maximum diameter of the optical system, due to the taper of the external side baffle 384. The substrate 310 has an index of refraction $n_{fp}$, where the subscript fp stands for femtoprojector.

The aspect ratio h:w of femtoprojector optical systems is preferably less than 2:1, and more preferably less than 1:1. The height, h, and width, w, are each preferably less than 2 mm, or even more preferably 1 mm or less. In the design shown, the image source 340 is axially aligned with the primary mirror 360. At the opposite face of the substrate 310, the secondary mirror 350 is located at the bottom of the obscuration 382. The annular exit aperture 370, which may be flat or curved, is positioned axially at an intermediate position between the primary and secondary mirrors. The exit aperture 370 includes a refractive interface between two materials of different indices of refraction, for example the substrate material 310 on one side and air on the other side. As a result, the shape and location of this interface is an additional design freedom. It may be concave, convex or a higher order shape. The inner edge 372 may also be farther away from, at the same distance or closer to the primary mirror 360 than the outer edge 374.

FIG. 5B shows the projection of the image source 340 onto the retina. The projected image 540 has a size B, so the overall magnification is given by m=B/b. The index of refraction of the eye (specifically, of the vitreous humor) is $n_{eye}$, which is approximately 1.34. L is the length of the eye, which is approximately 23 mm.

The following calculations are performed for the two-dimensional cross sections shown in FIG. 5 and certain approximations (e.g., small angles) are made in order to illustrate various principles. They can be straightforwardly extended to three dimensions and more exact calculations can be made. For the moment, assume that the source size b, and femtoprojector height and width, h and w, are fixed. The eye size L and the indices of refraction are also fixed. This leaves the selection of the image size B, secondary mirror size c, and quantities g, a, d which define the obscuration 382, and quantities j, f, v which define the side baffle 386, 384.

The image size, B, is determined by the desired span of eccentricity SOE according to $$B = (SOE/n_{eye})L \qquad (1)$$
$$= (L/n_{eye})SOE$$

where SOE is in radians. (L/$n_{eye}$) is a constant of proportionality approximately equal to 300 microns per degree span of eccentricity. An image spanning a 15 degree field of view (i.e., a femtoprojector with a 15 degree span of eccentricity) spans approximately 4.5 mm on the retina. The F/# is given approximately by L/($n_{eye}$ w), which is approximately F/17 or slower in this example.

The secondary mirror size, c, can be determined based in part on conservation of etendue. Setting the etendue at the image 540 equal to the etendue at the image source 340 yields $$n_{eye}B\theta_{eye}=n_{fp}b\theta_{fp} \qquad (2)$$

where $\theta_{eye}$ is the cone angle of light focusing on a single pixel in the image 540, and $\theta_{fp}$ is the corresponding acceptance angle at the image source 340. Substituting B=(L/$n_{eye}$) SOE, $\theta_{eye}$=w/L and $\theta_{fp}$=c/h and solving for c yields $$c = \left(\frac{1}{n_{fp}}\right)\left(\frac{hw}{b}\right)SOE \qquad (3)$$

where SOE is in radians. Note that c is the size of the secondary mirror that fulfills the condition that the etendue at the source image 340 matches the etendue at the retinal image 540, ignoring the effects of the center hole in the primary mirror and the obscuration of the exit aperture. For a given h, w, b and SOE, increasing the size of the secondary mirror beyond this value of c does not increase the amount of light forming the retinal image. This value of c scales as (h*w*SOE)/b. For constant h, w and b, the secondary mirror size scales with SOE. Assuming h=750 microns, w=1000 microns, 500 microns, and $n_{fp}$=1.34 yields a constant of proportionality of 20 microns per degree of SOE. For a 15 degree SOE, the corresponding secondary mirror size is c=300 microns.

The dimensions a, g, d, j, f, and v are chosen so that the optical system passes all image-forming rays while blocking all stray rays, as described previously in FIGS. 3A-3C. In particular, the dimensions (a,g) define the location of the inner edge 372 of the exit aperture and the dimensions (w,j) define the location of the outer edge 374 of the exit aperture. These dimensions can be determined based on ray tracing.

The remaining dimensions d, f, v are determined as follows. The dimension d is small enough so that the obscuration 382 has enough slope that it does not block image-forming ray 341Y in FIG. 3C. The dimensions (f,v) are selected so that the external side baffle 384 has enough taper that it does not block image-forming ray 341X in FIG. 3B, and also is long enough that it blocks all stray rays that propagate from the image source 340 directly through the exit aperture 370, including stray ray 347A in FIG. 3C.

Satisfying the simultaneous conditions of blocking all halo rays while passing all image-forming rays results in a minimum allowable value of the obscuration diameter, "a." In general, "a" is larger than the image source "b." Smaller values of "a" can be used. However, some amount of unwanted stray light may appear on the retina. Increasing the obscuration size, a, reduces the total power in the image. Consider just the center pixel of the image source 340. Let P be the total power emitted from this pixel within the acceptance angle $\theta_{fp}$ as defined above and assume that this power is uniformly distributed. The obscuration 382 blocks a fraction of the light roughly equal to (a/w)². The relative efficiency can be defined as:

$$\text{relative efficiency}=1-\text{fraction of light that is blocked} \qquad (4)$$

Figure 6A:
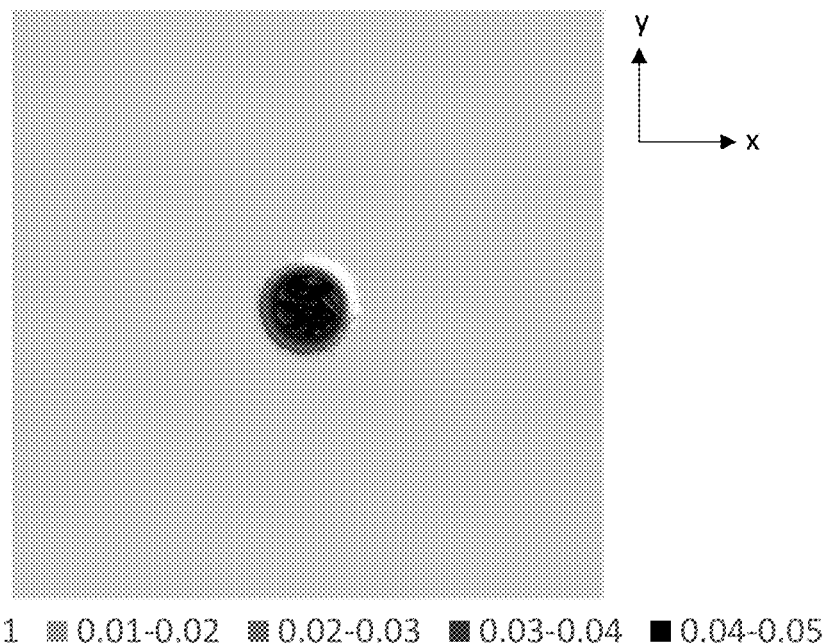
FIGS. 6A and 6B show images projected by a femtoprojector of the design shown in FIGS. 3-4.
Figure 6B:
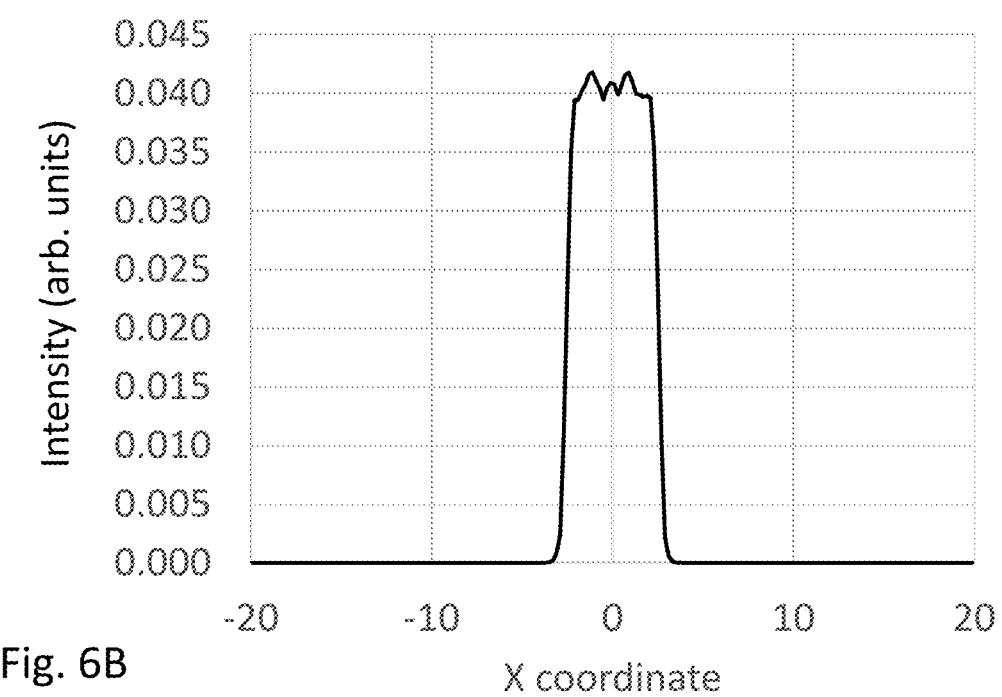

FIGS. 6A and 6B show images projected by a femtoprojector optical system designed according to the principles described above. In various examples of this type, the image source 340 has a lateral size of 500 microns or less. The secondary mirror 350 also has a lateral size of 500 microns or less. The entire optical system has a lateral size of 1000 microns or less, and the primary mirror 360 usually will be smaller due to the outward taper of the external side baffle 384, which may be in a range of 2.5 to 10 degrees. The entire optical system has a length of 1000 microns or less. The exit aperture may have a width of approximately 200 microns. Typical index of refraction for the core material 310 is approximately 1.50-1.55.

FIGS. 6A and 6B are generated by tracing rays from the entire image source 340. That is, the entire surface of the image source 340 is emitting light, and all rays are assumed to be incoherent with each other. FIG. 6A is a two-dimensional plot of the image projected onto the retina, where (x,y) are measured in mm. FIG. 6B shows a slice through y=0. Both figures show that only image-forming rays are incident on the retina. There are no stray rays shown in either figure.

Figure 7:
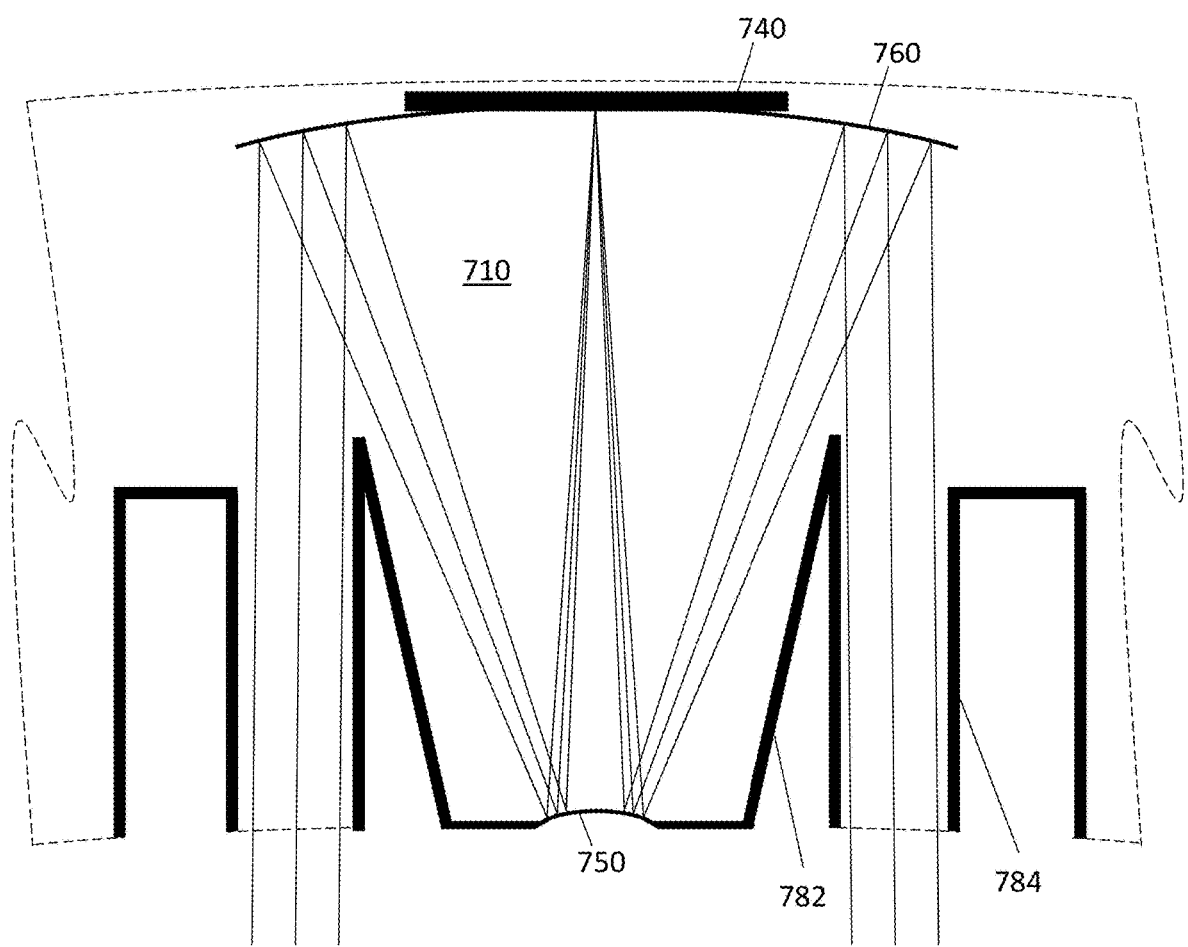
FIG. 7 shows a cross sectional view of another femtoprojector optical system.
Figure 8:
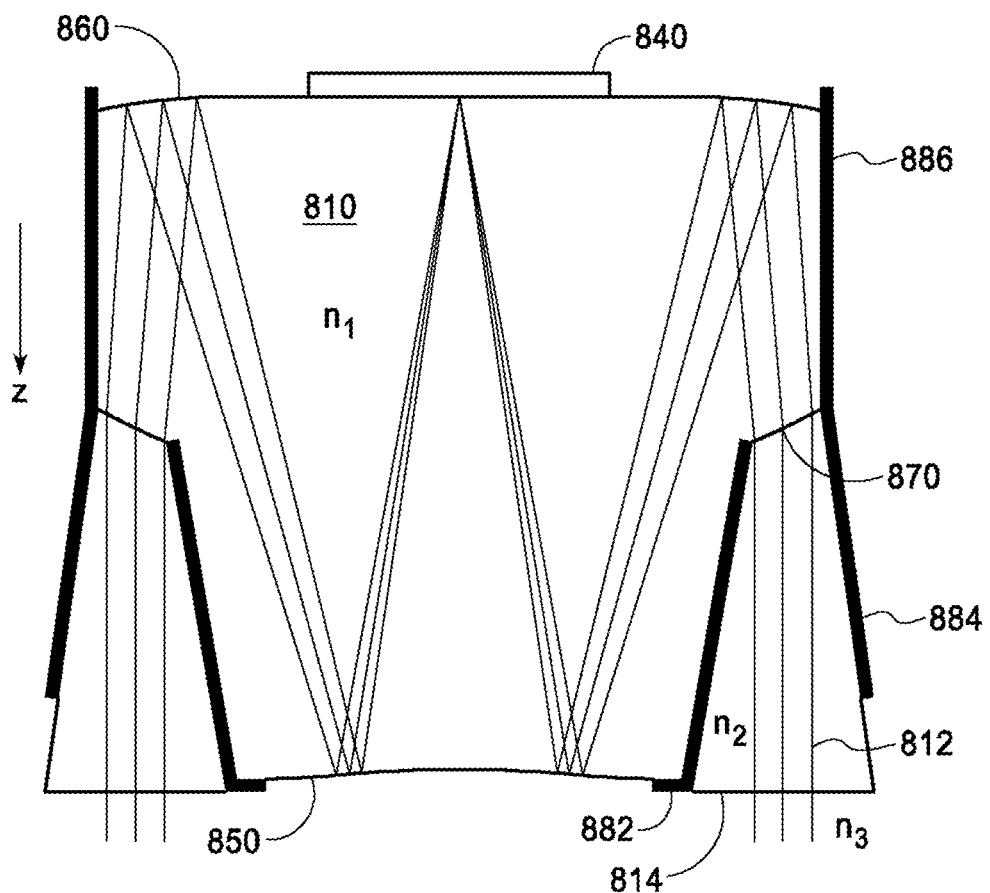
FIG. 8 shows a cross sectional view of yet another femtoprojector optical system.

FIGS. 7 and 8 show additional embodiments of femtoprojector optical systems. The design of FIG. 7 is also based on a transparent substrate 710, with the image source 740 and primary mirror 760 on one face and the secondary mirror 750 on an opposing face. However, the three-dimensional obscuration 782 is formed by creating a groove in the core material and then coating the interior of the groove with an absorbing material. A partial side baffle 784 is similarly created.

The design of FIG. 8 includes a planarization fill 812. If the core material 810 has refractive index n1, the fill material 812 has a different refractive index n2, and the surrounding material (e.g., the contact lens material) has refractive index n3, then there are two refractive interfaces. The first is at the exit aperture 870. The second refractive interface 814 is between the fill material 812 and the surrounding material.

Figure 9:
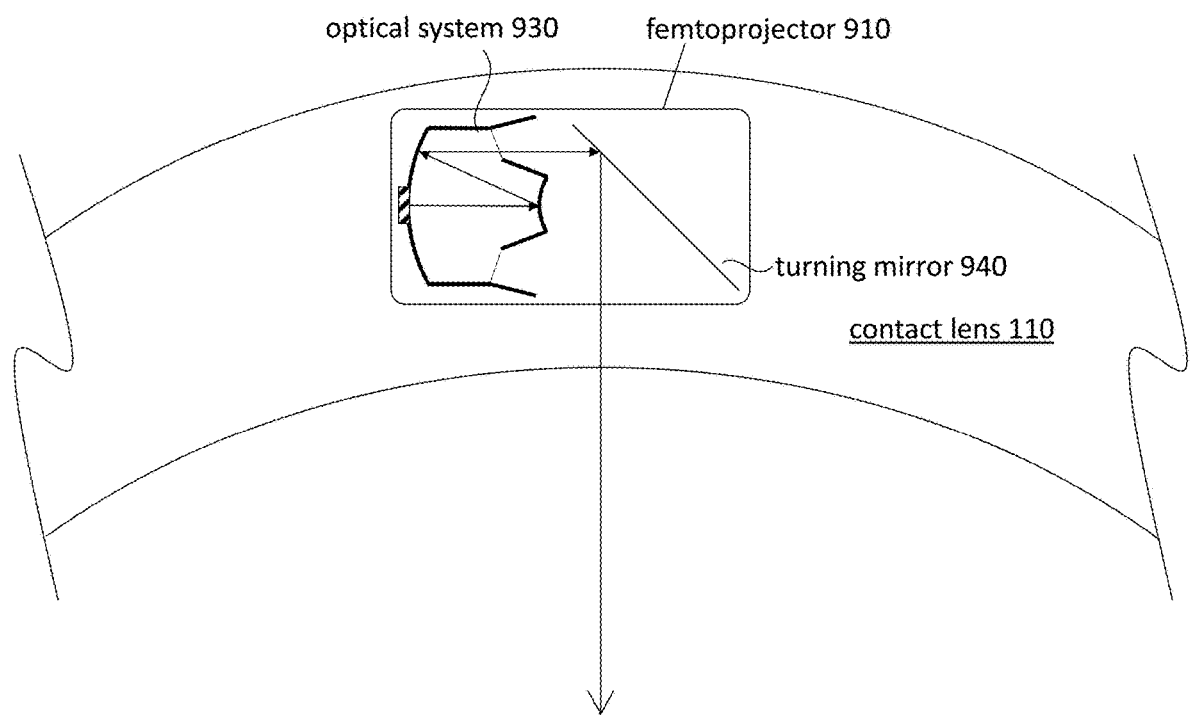
FIG. 9 shows a cross sectional view of a horizontally positioned femtoprojector in a contact lens.

In FIG. 2A a femtoprojector is shown mounted in a contact lens in a "vertical" configuration. That is, the optical axis and/or axis of symmetry of the femtoprojector 210 is approximately perpendicular to the outer surface of the contact lens 110. FIG. 9 shows a cross sectional view of a femtoprojector in a contact lens. In FIG. 9, the femtoprojector 910 is mounted in a "horizontal" configuration, meaning that the optical axis and/or axis of symmetry of the femtoprojector optical system 930 is approximately parallel to the outer surface of the contact lens 110. In this configuration, a turning mirror 940 directs image-forming rays from the femtoprojector optical system 930 toward a user's retina.

Figure 10:
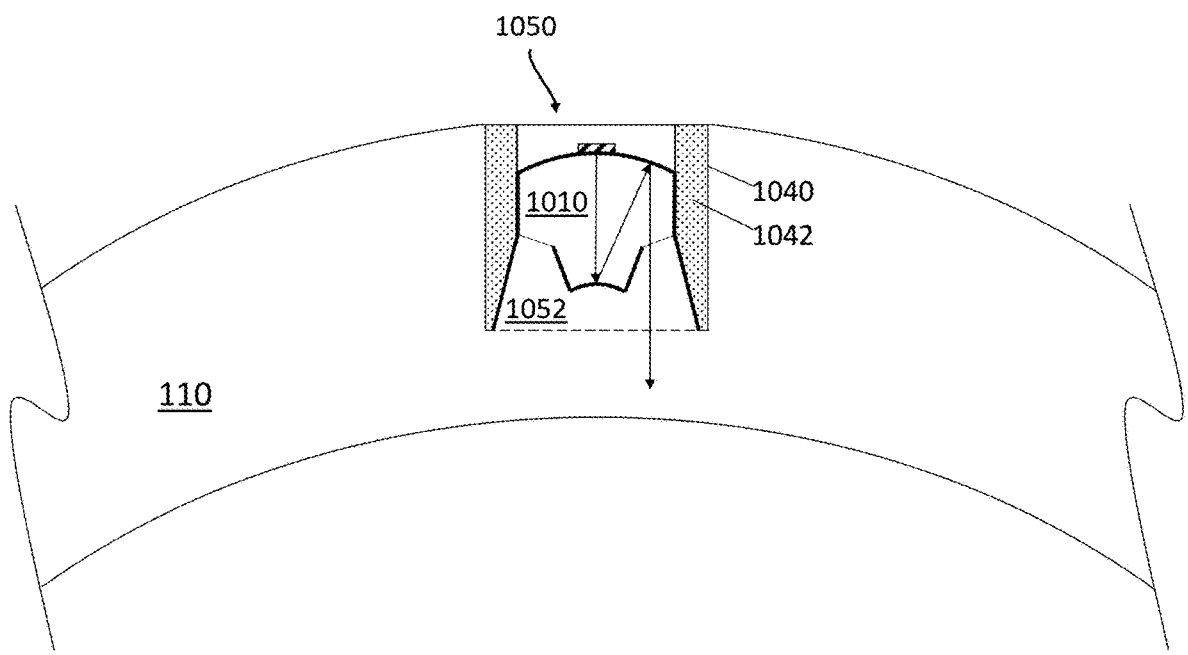
FIG. 10 shows a cross sectional view of yet another femtoprojector in a contact lens.

FIG. 10 shows a cross sectional view of yet another femtoprojector 1010 in a contact lens 110. The assembly of FIG. 10 has the following structure. A transparent cavity 1050 is formed in the contact lens 110 and the solid core 1010 shown in FIG. 4A is inserted into the cavity 1050. In this example, the cavity 1050 has straight sidewalls where it contacts the core 1010 and then tapers outwards beyond the exit aperture of the solid core 1010. The bottom of the cavity 1050 may be filled with clear epoxy 1052 or other transparent materials. In this example, the sidewalls of the cavity 1050 are absorbing. This can be achieved by coating the sidewalls of the cavity. Alternatively, a larger hole 1040 may first be formed and filled with dark colored epoxy 1042 (Master Bond EP42HT-2MED Black, for example). The cavity 1050 is then formed in the epoxy. The remaining dark colored epoxy 1042 serves as the absorbing side baffle for the femtoprojector. Materials other than epoxy can be used. Its sides may be coated instead, for example.

A variety of femtoprojector optical systems have been described. Each of them can be made small enough to fit in a contact lens using plastic injection molding, diamond turning, photolithography and etching, or other techniques. They can also be made larger for use in other applications. The designs are good at controlling the stray rays emitted by the image source. The systems typically include a solid rotationally symmetric transparent substrate with a curved primary mirror formed on one face, a secondary mirror on an opposing face, an annular exit aperture axially located between the two mirrors, and a three-dimensional obscuration between the secondary mirror and the exit aperture. Any of the designs may use additional light blocking, light-redirecting, absorbing coatings or other types of baffle structures as appropriate to reduce stray light.

When a femtoprojector optical system is described as "rotationally symmetric", it may include a flat on a side. In other words, the circular cross section is not a requirement, just a mostly circular shape. Optical systems may also be based on other shapes, such as triangles, squares, pentagons, etc.

Although the detailed description contains many specifics, these should not be construed as limiting the scope of the invention but merely as illustrating different examples. It should be appreciated that the scope of the disclosure includes other embodiments not discussed in detail above. For example, materials of various indices described above may in certain designs be air or gas filled. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A femtoprojector optical system for projecting an image produced by an image source to a retina of a user's eye when an eye-mounted display containing the femtoprojector optical system is mounted on the user's eye, the femtoprojector optical system comprising:
    a convex secondary mirror facing the image source;
    a concave primary mirror facing the secondary mirror, the secondary mirror and primary mirror cooperating to project the image from the image source;
    a baffle system comprising:
        a three-dimensional obscuration extending from the secondary mirror towards the primary mirror, where the obscuration blocks stray rays that are not reflected by the secondary mirror;
        an annular exit aperture having an inner edge and an outer edge, the exit aperture positioned at an axial location that is between the convex secondary mirror and the concave primary mirror, where:
            image-forming rays from the image source are incident on and reflected by the secondary mirror to the primary mirror and out the exit aperture;
            the three-dimensional obscuration is positioned between the secondary mirror and the inner edge of the exit aperture; and
            the obscuration blocks stray rays that propagate directly from the image source to between the secondary mirror and the inner edge; and
    where the femtoprojector optical system fits within a 2 mm×2 mm×2 mm volume.

2. The femtoprojector optical system of claim 1 where the axial location of the exit aperture is closer to midway between the primary and secondary mirrors, than to either the primary mirror or the secondary mirror.

3. The femtoprojector optical system of claim 1 where the obscuration extends an entire length between the secondary mirror and the inner edge of the exit aperture.

4. The femtoprojector optical system of claim 1 where the obscuration comprises:
    an annular portion adjacent to the secondary mirror; and
    a frustum-shaped portion extending an entire length between the annular portion and the inner edge of the exit aperture.

5. The femtoprojector optical system of claim 1 where the baffle system further comprises:
    an external side baffle extending from the outer edge of the exit aperture away from the primary mirror, where the external side baffle blocks stray rays that propagate directly from the image source through the exit aperture.

6. The femtoprojector optical system of claim 5 where the external side baffle blocks all stray rays that propagate directly from the image source through the exit aperture and the external side baffle does not extend beyond the secondary mirror.

7. The femtoprojector optical system of claim 5 where the external side baffle does not extend beyond the secondary mirror.

8. The femtoprojector optical system of claim 5 where the external side baffle is tapered outwards from the outer edge of the exit aperture.

9. The femtoprojector optical system of claim 8 where the external side baffle is tapered at an angle in a range of 2.5 to 10 degrees.

10. The femtoprojector optical system of claim 1 where the baffle system further comprises:
    an internal side baffle extending from the outer edge of the exit aperture toward the primary mirror.

11. The femtoprojector optical system of claim 2 further comprising:
    a solid transparent substrate with the primary mirror on one face of the solid transparent substrate and with the secondary mirror and the exit aperture on opposing faces of the solid transparent substrate.

12. The femtoprojector optical system of claim 11 where the primary mirror and secondary mirror are implemented as reflective coatings on the substrate, and the obscuration is implemented as an absorptive coating on the substrate.

13. The femtoprojector optical system of claim 1 where the baffle system operates so that no stray rays can propagate directly from the image source to a pupil of the user's eye when the eye-mounted display is mounted on the user's eye.

14. The femtoprojector optical system of claim 1 where the exit aperture includes a refractive interface between two materials of different indices of refraction.

15. The femtoprojector optical system of claim 1 where the femtoprojector has an F/number of F/17 or slower.

16. The femtoprojector optical system of claim 1 where the femtoprojector optical system is small enough to mount in a contact lens wearable by the user.

17. The femtoprojector optical system of claim 1 where the exit aperture has a maximum lateral dimension of not more than 1 mm.

18. A femtoprojector optical system for projecting an image produced by an image source to a retina of a user's eye when an eye-mounted display containing the femtoprojector optical system is mounted on the user's eye, the femtoprojector optical system comprising:
- a convex secondary mirror facing the image source;
- a concave primary mirror facing the secondary mirror; and
- an annular exit aperture having an inner edge and an outer edge, the exit aperture positioned at an axial location that is between the convex secondary mirror and the concave primary mirror, where image-forming rays from the image source are incident on and reflected by the secondary mirror to the primary mirror and out the exit aperture, the secondary mirror and primary mirror cooperating to project the image from the image source; and
- a baffle system comprising:
    - a three-dimensional obscuration that extends an entire length between the secondary mirror and the inner edge of the exit aperture, where the obscuration blocks all stray rays that propagate directly from the image source to between the secondary mirror and the inner edge;
    - an external side baffle extending and tapering outwards from the outer edge of the exit aperture away from the primary mirror, where the external side baffle blocks all stray rays that propagate directly from the image source through the exit aperture; and
    - an internal side baffle extending from the outer edge of the exit aperture toward the primary mirror; and
- a solid transparent substrate, with the primary mirror implemented as a reflective coating on one face of the solid transparent substrate, with the secondary mirror implemented as a reflective coating on an opposing face of the solid transparent substrate, with the exit aperture implemented as a refractive interface on another opposing face of the solid transparent substrate, and with the obscuration and the internal side baffle implemented as absorptive coatings on the solid transparent substrate; and
- where the femtoprojector optical system fits within a 2 mm×2 mm×2 mm volume.

19. An optical system for projecting an image produced by an image source, the optical system comprising:
- a convex secondary mirror facing the image source;
- a concave primary mirror facing the secondary mirror;
- an annular exit aperture having an inner edge and an outer edge, the exit aperture positioned at an axial location that is between the convex secondary mirror and the concave primary mirror, where image-forming rays from the image source are incident on and reflected by the secondary mirror to the primary mirror and out the exit aperture, the secondary mirror and primary mirror cooperating to project the image from the image source; and
- a baffle system comprising:
    - a three-dimensional obscuration between the secondary mirror and the inner edge of the exit aperture, where the obscuration blocks stray rays that propagate directly from the image source to between the secondary mirror and the inner edge.

20. The optical system of claim 19 where the axial location of the exit aperture is closer to midway between the primary and secondary mirrors, than to either the primary mirror or the secondary mirror.

21. The optical system of claim 19 where the obscuration extends an entire length between the secondary mirror and the inner edge of the exit aperture.

22. The optical system of claim 19 where the obscuration comprises:
- an annular portion adjacent to the secondary mirror; and
- a frustum-shaped portion extending an entire length between the annular portion and the inner edge of the exit aperture.

23. The optical system of claim 19 where the baffle system further comprises:
- an external side baffle extending from the outer edge of the exit aperture away from the primary mirror, where the external side baffle blocks stray rays that propagate directly from the image source through the exit aperture.

24. The optical system of claim 23 where the external side baffle blocks all stray rays that propagate directly from the image source through the exit aperture and the external side baffle does not extend beyond the secondary mirror.

25. The optical system of claim 23 where the external side baffle does not extend beyond the secondary mirror.

26. The optical system of claim 23 where the external side baffle is tapered outwards from the outer edge of the exit aperture.

27. The optical system of claim 26 where the external side baffle is tapered at an angle in a range of 2.5 to 10 degrees.

28. The optical system of claim 19 where the baffle system further comprises:
- an internal side baffle extending from the outer edge of the exit aperture toward the primary mirror.

29. The optical system of claim 19 further comprising:
- a solid transparent substrate with the primary mirror on one face of the solid transparent substrate and with the secondary mirror and the exit aperture on opposing faces of the solid transparent substrate.

30. The optical system of claim 29 where the primary mirror and secondary mirror are implemented as reflective coatings on the substrate, and the obscuration is implemented as an absorptive coating on the substrate.

31. The optical system of claim 19 where the exit aperture has a maximum lateral dimension of not more than 1 mm.

32. The optical system of claim 19 where the optical system fits within a 2 mm×2 mm×2 mm volume.

* * * * *